March 1, 1960 R. A. LEE, JR 2,926,736
DRIVE COUPLING FOR TRACTOR PROPELLED TOOL
Filed Aug. 22, 1955
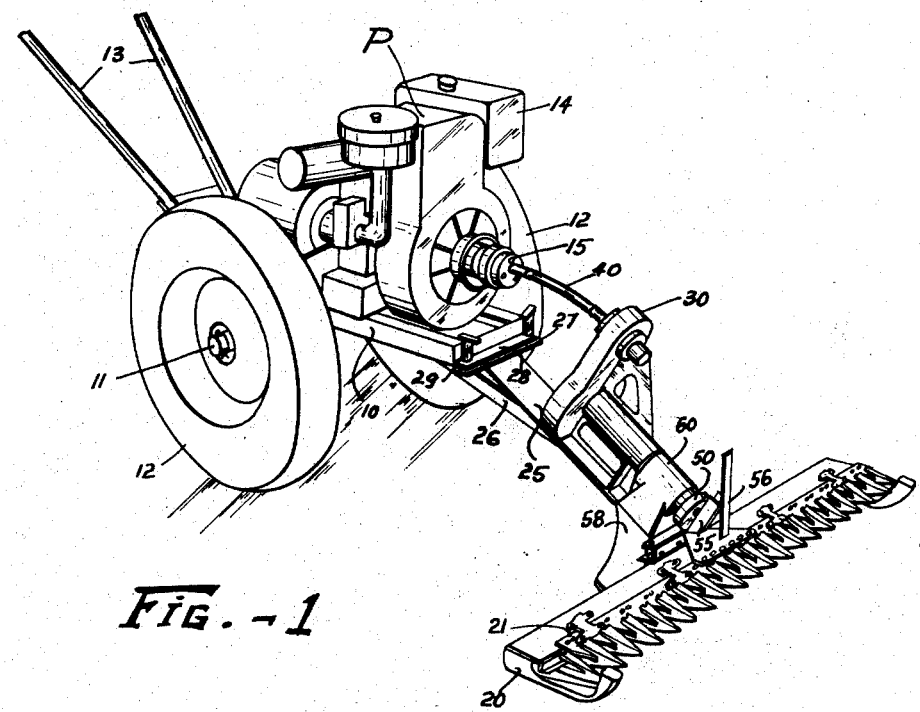
FIG.-1
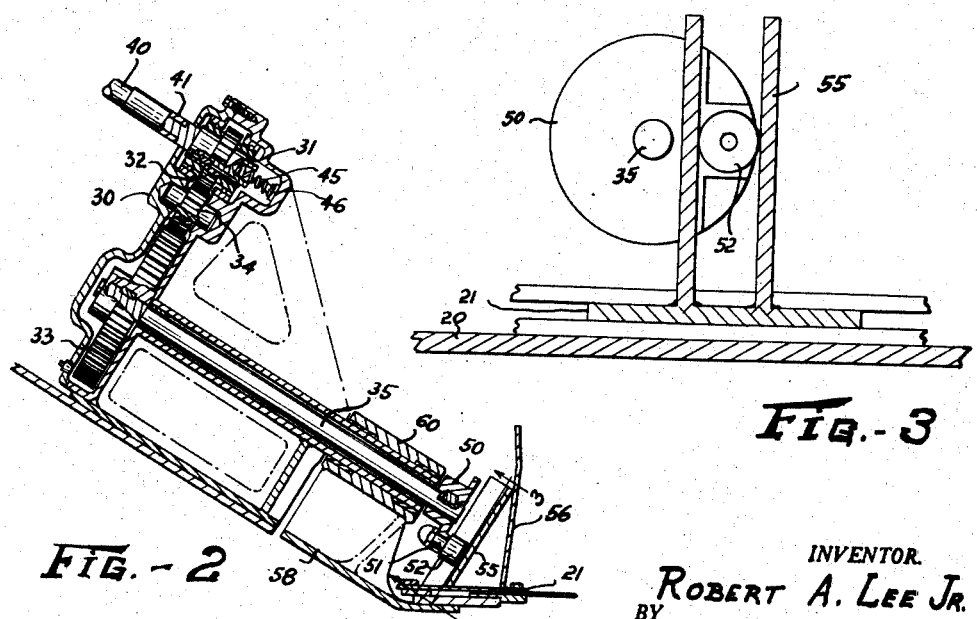
FIG.-2
FIG.-3
INVENTOR.
ROBERT A. LEE Jr.
BY Bates, Teare & McBean
ATTORNEYS ately # United States Patent Office 2,926,736
Patented Mar. 1, 1960

2,926,736

DRIVE COUPLING FOR TRACTOR PROPELLED TOOL

Robert A. Lee, Jr., Mayfield Heights, Ohio, assignor to Bready Tractor & Implement Company, Solon, Ohio, a corporation of Ohio Application August 22, 1955, Serial No. 529,837

1 Claim. (Cl. 180—53)

This invention relates to farm and garden implements generally and more particularly relates to an improved arrangement for coupling a power-operated garden tool to a power driven tractor.

The tractor to which this invention is directed is of the type embodying a two-wheeled tractor frame carrying a source of motive power and is guideable by an operator who walks behind the tractor to direct the application of a garden tool operatively supported on a tool frame at the front end of the tractor. The tractor is adapted to direct various types of tools some of which require a power drive. Among the desirable features is the ability to interchange easily from one tool to another, and the ability to isolate the tool from a power drive without stopping the source of motive power on the tractor as for example, when transferring the tool from one work area to another. Another desirable feature is the ability of the tool to follow the contour of the ground or surface to which it is applied.

Accordingly, a principal object of this invention relates to the provision of a wheeled tractor with a front end power take-off adapted for selective coupling to a power operated tool carried at the front end of the tractor.

Another object of this invention relates to the provision of a flexible and detachable connection between the tractor drive and a power operated tool.

A further object of the invention relates to the provision of an improved mounting for a power operated tool on its frame which will enable it to more readily follow the contour of the surface to which it is applied.

A still further object of the invention relates to the provision of an improved arrangement for translating rotating power from the tractor to a reciprocal tool movement.

Briefly, the foregoing and other objectives are readily obtainable in accordance with this invention by providing a power-driven wheeled tractor frame with a front end power take-off which can be selectively coupled through a flexible and detachable shaft connection to a power operated tool carried by a tool frame mounted on the front end of the tractor frame. A crank and cam follower are provided for coaction between a driven power shaft and the power operated tool to translate the shaft motion to a reciprocating motion at the tool. Further, the tool is provided with a swivel mounting to the tool frame to enable the tool to more readily follow the contour of the ground or other surface to which it is applied.

In the drawings;

Fig. 1 is a perspective view of the wheeled tractor and a power operated tool;

Fig. 2 is an enlarged section through a portion of the tool frame to illustrate the details of the driving coupling; and Fig. 3 is an enlarged section taken along the lines 3—3 in Fig. 2 to illustrate the motion translating arrangement.

Referring now more particularly to Fig. 1 of the drawings, the tractor is shown as embodying a tractor frame 10 having an axle 11 which supports ground engaging wheels 12 and carrying rearwardly extending handles 13 by which an operator walking behind the tractor can guide and direct the tractor's direction. The tractor frame 10 also supports a power unit which, in the preferred embodiment shown, is in the form of a gasoline engine P which has fuel supplied to it from a tank 14 and a driving connection to the wheels 12. The engine P is provided with a power take off including a rotating shaft designated generally at 15 to which a power operated tool can be coupled.

The tool, which in the preferred embodiment shown, embodies a reciprocal cutter having a cutter frame 20 carrying a cutter blade 21 is operatively supported on a tool frame having an extended tongue portion 25 and reinforcing members such as 26 which are removably mounted at the front end of the tractor frame. The tongue portion 25 is provided with an apertured plate 27 at its free extremity which abuts against an outwardly extending plate 28 at the front end of the tractor frame 10 through which suitable clamping bolts like 29 may be inserted and tightened to securely connect the tool frame to the tractor frame.

In its preferred form, the present invention contemplates that the power transmission from the engine P on the tractor frame 10 to the cutter blade 21 will pass through a power transmission mechanism which is housed in a gear housing 30 carried by tongue portion 25 of the tool frame. As best shown in the sectional view of Fig. 2 of the drawings, the power transmission mechanism embodies a shaft 31 which carries a gear 32 adapted to drive a larger spur gear 33 through an intermediate pinion 34. The spur gear 33 is keyed on the shaft 35 and coacts with the others to transmit power from the engine P to the cutter blade 21 in a manner to be hereinafter more fully described.

The driving connection between the front end power take off on the tractor frame 10 and the shaft 31 is made through a flexible shaft 40 which has one end coupled through a conventional clutch to the power take-off shaft 15. The other end of the flexible shaft 40 has a rectangular socket 41 in which a rectangular end of the shaft 31 is seated, thus completing the chain of power transmission from engine P through the power transmission to the driven shaft 35.

In the preferred form shown, the power receiving shaft 31 of the transmission mechanism is keyed to the gear 32 in a manner which permits free axial movement within the housing 30. This free axial movement is restrained by helical spring 45 which coacts against an abutment 46 on the interior wall of the housing 30 to bias the shaft 31 in a direction towards the power take-off on the tractor frame 10. This arrangement insures that a positive driving connection is maintained between each end of the flexible shaft 40 and the corresponding clutch on the power take-off and the coupling on the power transmission, while at the same time permitting easy detachment and removal of the flexible shaft 40 when it is desired to isolate the tool from the source of power. This can be accomplished by simply moving the power transmission end of the shaft 40 axially against the force of the helical spring 45 until the clutch end of the shaft is disengaged from the power take off shaft 15, and then the flexible shaft 40 may be readily removed from engagement with the power transmission shaft 31.

In order that the rotation of the driven shaft 35 can be converted to a linear movement to reciprocate the cutter blade 21 of the tool shown in the drawings, a wheel 50 is securely keyed on the free extremity of the driven shaft 35 for rotation therewith. The wheel 50 is provided with an axially disposed through aperture at a location spaced radially from its axis of rotation to receive the shaft 51 of a roller 52 which forms a crank on the driven shaft 35. The cutter blade 21 is provided with an upstanding channel 55 which forms a follower for the crank roller 52 and translates its rotation about the axis of the driven shaft 35 to a linear reciprocal motion in a plane transverse to that axis. The details of this motion translating arrangement are best shown in Figs. 2 and 3 of the drawings where the channel-shaped cam follower 55 is shown reinforced by an upstanding bar 56 secured at its base to the cutter blade 21. Thus, when the flexible shaft 40 interconnects the power take-off from the engine P to the power transmission mechanism on the tool frame, the shaft 35 is rotated and the crank roller 52 rides along the cam follower channel 55 to reciprocate the cutter blade 21 on its frame 20.

In order that the cutter frame 20 will closely follow the contour of the ground or other surface to which it is applied, the frame is provided with a bracket 58 carrying a bearing sleeve 60 which is adapted to encircle the driven shaft 35. In this manner, the entire cutter frame 20 is free to swivel about the driven shaft 35 in a plane transverse to the axis of rotation and, with the preferred arrangement shown, I have found that the cutter frame 20 can be rotated through 360° without disturbing the registration of the cutter blade 21 with the knives formed on the cutter frame. Thus, the swivel mounting of the cutter frame 20, which permits freedom of movement in a plane transverse to the drive axis, coacts with the interconnection between the tongue portion 25 of the tool frame and the front end of the tractor frame 10 to enable the cutter frame 20 to closely follow the contour of the ground.

This invention, therefore, while improving the ultimate operation of the tool, also simplifies its operation and at the same time increases its adaptability to different tools. The front end power take-off on the tractor frame is readily adaptable for driving coaction with any power operated tool that may be coupled to the front end of the tractor frame. Similarly, the flexible interconnection between the power take-off and the power transmission on the tool frame permits greater freedom of tool movement and tool interchange. The power translation arrangement and the swivel mounting of the tool on its frame coact with the other elements in the apparatus to provide an improved and more efficient garden implement which is adaptable for many uses.

I have shown and described what I consider to be the preferred embodiment of my invention along with suggested modified forms, and it will be obvious to those skilled in the art that other changes and modifications may be made without departing from the scope of my invention as defined by the appended claim.

I claim:

In a power-driven wheeled tractor frame having a front end take-off, an independent tool frame comprising, a self-contained assembly including a power transmission, said power transmission including a housing carried by the tool frame, a power actuated tool at one end and a driving connection therebetween, coupling means at the other end of the tool frame for detachably connecting said other end of the tool frame to the front end of the tractor frame with the tool depending towards engagement with the ground, said coupling means comprising a quick-release clamp coupling for detachably connecting the tool frame to the tractor frame, a flexible shaft, means for detachably connecting said flexible shaft in positive driving engagement between the power take-off and the power transmission, the detachable means including a power-receiving shaft operatively supported for limited axial movement within the housing, one end of said power-receiving shaft extending externally of the housing towards the power take-off, and having means for rotatably engaging said flexible shaft while permitting axial separation of the power-receiving shaft from the flexible shaft, resilient means within the housing biasing said power-receiving shaft axially outward towards engagement with the flexible shaft, and other means for transmitting power from the power-receiving shaft to the power transmission.

References Cited in the file of this patent

UNITED STATES PATENTS

| | | |
|---|---|---|
| 729,694 | Stewart | June 2, 1903 |
| 1,173,704 | Blanchard | Feb. 29, 1916 |
| 1,411,440 | Kocourek | Apr. 4, 1922 |
| 1,459,998 | Simmons | June 26, 1923 |
| 1,460,261 | Martin | June 26, 1923 |
| 1,805,861 | Bass | May 19, 1931 |
| 2,335,541 | Ronning | Nov. 30, 1943 |
| 2,425,992 | Cadwallader | Aug. 19, 1947 |
| 2,464,059 | Roos et al. | Mar. 8, 1949 |
| 2,498,138 | Shepard et al. | Feb. 21, 1950 |
| 2,532,230 | Hupp | Nov. 28, 1950 |
| 2,604,748 | Hayes | July 29, 1952 |
| 2,614,473 | Yacoby | Oct. 21, 1952 |
| 2,626,000 | Yergens | Jan. 20, 1953 |
| 2,645,944 | Crichton et al. | July 21, 1953 |